United States Patent
Nakajima et al.

(10) Patent No.: US 8,130,076 B2
(45) Date of Patent: *Mar. 6, 2012

(54) KEYLESS ENTRY DEVICE

(75) Inventors: Satoshi Nakajima, Miyagi-ken (JP);
Satoshi Hayasaka, Miyagi-ken (JP);
Akiyuki Takoshima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1328 days.

This patent is subject to a terminal disclaimer.

(21) Appl. No.: 11/746,474

(22) Filed: May 9, 2007

(65) Prior Publication Data

US 2008/0048829 A1 Feb. 28, 2008

(30) Foreign Application Priority Data

May 11, 2006 (JP) ................................. 2006-132878

(51) Int. Cl.
*B60R 25/00* (2006.01)
(52) U.S. Cl. ..................... 340/5.72; 340/426.16; 701/36
(58) Field of Classification Search ................. 340/5.61, 340/5.72, 426.17, 426.36, 426.16, 5.62; 307/9.1, 307/10.1, 10.2, 10.3, 10.4, 10.5; 455/99, 455/69, 70, 134, 456, 67.1; 701/36
See application file for complete search history.

(56) References Cited

U.S. PATENT DOCUMENTS

| | | | |
|---|---|---|---|
| 5,592,170 A * | 1/1997 | Price et al. ....................... 342/22 |
| 2001/0005170 A1 * | 6/2001 | Heide et al. .................. 340/5.61 |
| 2002/0025823 A1 | 2/2002 | Hara | |
| 2006/0267407 A1 | 11/2006 | Nagaoka et al. | |

FOREIGN PATENT DOCUMENTS

| | | |
|---|---|---|
| EP | 1 184 236 | 3/2002 |
| EP | 1 189 306 | 3/2002 |
| EP | 1 726 496 | 11/2006 |

OTHER PUBLICATIONS

European Search Report for corresponding European Patent Application Serial No. EP 07009160.8 dated Jul. 16, 2007.

* cited by examiner

*Primary Examiner* — Nabil Syed
(74) *Attorney, Agent, or Firm* — Brinks Hofer Gilson & Lione

(57) ABSTRACT

A keyless entry device can accurately judge or determine whether a portable device exists inside or outside a vehicle. A vehicle-side controller includes a memory that stores an inside data group having a plurality of intensity information of a request signal transmitted from the plurality of transmitting antennas when the portable device is located along an inside of a vehicle. Also included is an outside data group having a plurality of intensity information of a request signal transmitted from the plurality of transmitting antennas when the portable device is located along an outside of the vehicle. The vehicle-side controller judges an area where the portable device exists from the intensity information of the request signal received from the portable device. The controller instantly judges the inside or the outside of the vehicle, when the portable device exists in an area apart from a boundary. The controller also judges which data group of the inside and outside data groups stored in the memory approximates the intensity information when the portable device exists in the vicinity of the boundary.

3 Claims, 6 Drawing Sheets

KEYLESS ENTRY DEVICE

CLAIM OF PRIORITY

This application claims the benefit of Japanese Patent Application No. 2006-132878 filed May 11, 2006, the entire contents of which are incorporated herein by reference.

BACKGROUND

1. Field of the Invention

The present invention relates to a keyless entry device for locking and unlocking doors of a vehicle by performing a wireless communication between a vehicle-side device and a portable device, and more particularly, to a keyless entry device for accurately judging whether the portable device exists inside or outside a predetermined boundary.

2. Description of the Related Art

A keyless entry device for locking and unlocking doors of a vehicle by performing a wireless communication between a vehicle-side device, which is provided on a vehicle, and a portable device belonging to a user is well known. A passive keyless entry device is also well known in which an automatic communication is performed between the vehicle-side device and the portable device when a portable device is close to the vehicle, and the locking and unlocking operation is performed on a door of the vehicle when a verification of ID, which is uniquely set in each portable device, is performed. Japanese Unexamined Patent Application Publication No. 2002-77972 (U.S. Patent Application No. 2002/0025823) discloses an example of such a keyless entry device.

Particularly, in the passive keyless entry device, judging whether the portable device is located outside or inside the vehicle is an important issue. Because of this reason, a vehicle-side device is provided with a plurality of transmitting antennas on several places of the vehicle. The vehicle-side device judges or determines that the portable device exists inside the vehicle when the portable device receives a radio wave from the transmitting antennas inside the vehicle and judges or determines that the portable device exists outside the vehicle when the portable device receives a radio wave from the transmitting antennas outside the vehicle.

However, in the known keyless entry device, it may be difficult to accurately judge or determine the position of the portable device. For example, even though the portable device is outside the vehicle, a misjudging or determination error occasionally occurs concluding that the portable device is inside the vehicle when the radio wave of the transmitting antenna inside the vehicle is leaked out from the vehicle inside. Conversely, even though the portable device is inside the vehicle, a misjudging or determination error occasionally occurs concluding that the portable device is outside the vehicle when the radio wave of the transmitting antenna outside the vehicle is leaked to the vehicle inside. If a transmitting power of the radio wave from the transmitting antenna is reduced in order to prevent the leakage of the radio wave, occasionally, the portable device can not receive the radio wave even though the portable device is inside the vehicle. This is also one factor that causes the error by misjudging.

On this account, the present applicant contrives a keyless entry device configuring a data group of a vehicle inside and a data group of a vehicle outside by previously obtaining information of an intensity from a plurality of transmitting antennas in each case of a portable device in accordance with the vehicle inside and the vehicle outside distinguished by a boundary between the inside and outside of a vehicle, detecting signal intensities from the plurality of transmitting antennas for judging a position of the portable device, and judging which side of data groups of the vehicle inside or the vehicle outside approximates to the data by using a Maharanobis distance calculation. Further, the boundary which is a reference judging a position is not limited to the boundary between the inside and outside of the vehicle.

However, in order to configure a data group used in a Maharanobis distance calculation, a plurality of data is acquired. Accordingly, the data that is previously acquired is taken from only the vicinity of the boundary, while the data of the position apart from the boundary is not acquired. Using this method, it is possible for the vicinity of the boundary to judge or determine a position very accurately by the Maharanobis distance calculation, but there is a problem in that it is not easy to judge or determine a position very accurately, even if the position is by any side of the vehicle, when the position is greatly apart from the boundary. The reason is, regarding to the position greatly apart from the boundary, a ratio of difference between a Maharanobis distance for the data group of the vehicle outside and a Maharanobis distance for data group of the vehicle inside decreases. To judge or determine this accurately, it is also possible to consider obtaining data by additionally including the position greatly apart from the boundary, but there is a problem that the number of processes increase in excessively high rate, and the data rate in the boundary point relatively decreases, whereupon there is another problem that the accuracy in a principal boundary position is reduced.

In the keyless entry device contrived by the applicant in the past, even though the portable device is located at any position, it operates to judge or determine by using the Maharanobis distance. Consequently, it takes too much time to judge or determine the position from the viewpoint of a whole system operation.

BRIEF SUMMARY

In a first aspect, a keyless entry device is provided. The keyless entry device includes a vehicle-side device including a vehicle-side transmitter that has a plurality of transmitting antennas operable to transmit a request signal provided in a vehicle and a vehicle-side receiver operable to receive an answer signal. Also included is a portable device including a portable device receiver operable to receive the request signal and a portable device transmitter operable to transmit the answer signal. The vehicle-side device includes a vehicle-side controller operable to perform a predetermined control process when the answer signal from the portable device is authenticated. The portable device also includes a portable device controller operable to detect respective intensity of signals transmitted from the plurality of transmitting antennas of the vehicle-side device. At least one of the vehicle-side controller and the portable device controller includes a memory operable to store data. The memory is operable to store at least one of a first data group having a plurality of intensity information obtained by allowing the portable device to receive a signal transmitted from the plurality of transmitting antennas and a first parameter required to compare the first data group with the intensity information when the portable device is located along one side of a predetermined boundary with respect to the vehicle. The memory is also operable to store at least one of a second data group having a plurality of intensity information obtained by allowing the portable device to receive a signal transmitted from the plurality of transmitting antennas and a second parameter required to compare the second data group with the intensity information when the portable device is located along the other side of predetermined boundary with respect to the vehicle. At least one of the vehicle-side controller and the portable device controller, including the memory, is operable to judge a distance of the portable device from a predetermined boundary on the basis of the intensity information obtained by allowing the portable device to receive a signal transmitted from the plurality of transmitting antennas. At least one of the vehicle-side controller and the portable device controller is further operable to judge a position of the portable device in accordance with the judgment result when it is judged that the distance of the portable device from the predetermined boundary is equal to or greater than a predetermined distance, and the position is judged from which one data group of the first and second data groups the intensity information approximates by using the first and second data groups or the first and second parameters when it is determined that the distance of the portable device from the predetermined boundary is equal to or less than a predetermined distance.

In a second aspect, at least one of the vehicle-side controller and the portable device controller is operable to calculate a Maharanobis distance of the intensity information of the signals and the data groups by using the data groups or the parameters. At least one of the vehicle-side controller and the portable device controller is further operable to judge that the intensity information approximates the data group having a small Maharanobis distance therebetween.

In a third aspect, a keyless entry device is provided. The keyless entry device includes a vehicle-side device including a vehicle-side transmitter that has a plurality of transmitting antennas operable to transmit a request signal provided in a vehicle and a vehicle-side receiver operable to receive an answer signal. Also included is, a portable device including a portable device receiver operable to receive the request signal and a portable device transmitter operable to transmit the answer signal. The vehicle-side device includes a vehicle-side controller operable to perform a predetermined control process when the answer signal from the portable device is authenticated. The portable device includes a portable device controller operable to detect respective intensity of signals transmitted from the plurality of transmitting antennas of the vehicle-side device. At least one of the vehicle-side controller and the portable device controller is operable to judge a distance of the portable device from a predetermined boundary on the basis of the intensity information obtained by allowing the portable device to receive a signal transmitted from the plurality of transmitting antennas. At least one of the vehicle-side controller and the portable device controller is further operable to judge a position of the portable device in accordance with the judgment result when it is determined that the distance of the portable device from the predetermined boundary is equal to or greater than a predetermined distance. At least one of the vehicle-side controller and the portable device controller is further operable to judge the position of the portable device by a neural network when it is determined that the distance of the portable device from the predetermined boundary is equal to or less than a predetermined distance.

In a fourth aspect, the predetermined boundary with respect to the vehicle is a boundary between the inside and outside of the vehicle.

In a fifth aspect, the predetermined boundary with respect to the vehicle is a surface that is spaced by a predetermined distance away from the transmitting antennas provided in the vicinity of a door of vehicle toward the outside of the vehicle.

Other systems, methods, features, and advantages of the invention will be, or will become, apparent to one with skill in the art upon examination of the following figures and detailed description. It is intended that all such additional systems, methods, features, and advantages be included within this description.

BRIEF DESCRIPTION OF THE DRAWING

The components in the figures are not necessarily to scale, emphasis instead being placed upon illustrating the principles of the invention. Moreover, in the figures, like referenced numerals designate corresponding parts throughout the different views.

DESCRIPTION OF THE PREFERRED EMBODIMENTS

Figure 1:
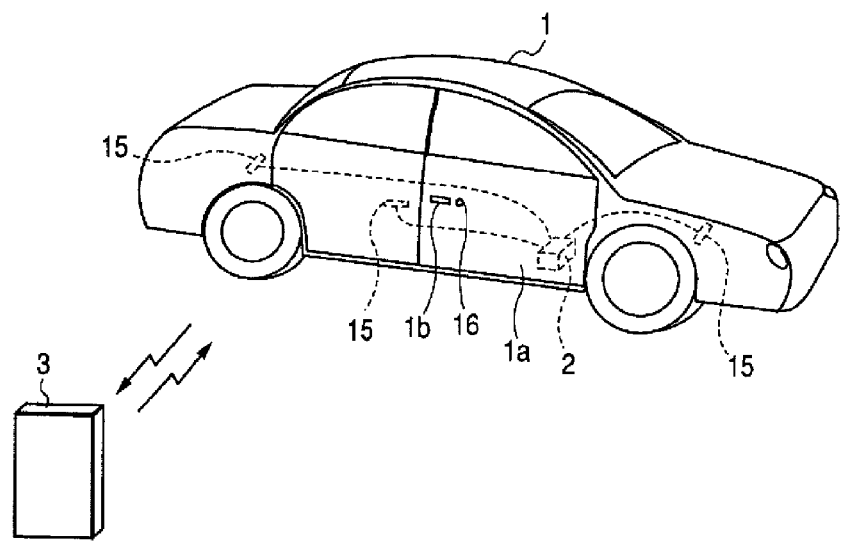
FIG. 1 is a schematic diagram of a keyless entry device according to an embodiment.

An embodiment of the invention will be described in detail on the basis of drawings. FIG. 1 is a schematic diagram of a keyless entry device according to the embodiment. The keyless entry device according to the embodiment performs locking and unlocking a door 1a of a vehicle 1. A vehicle-side device 2 is provided in the vehicle 1 side. A user carries a portable device 3. A verification or an order of the locking and unlocking is operated by performing a wireless communication between the vehicle-side device 2 and the portable device 3. The vehicle-side device 2 is provided with a plurality of transmitting antennas 15 at several places in the vehicle 1, whereby a request signal is transmitted from each transmitting antenna 15 to the portable device 3. Additionally, the request signal comprises low frequency signals.

Hereinafter, the case of unlocking the door 1a when the user approaches the vehicle 1 will be mainly described. In the embodiment, if the user carrying the portable device 3 unlocks the door 1a, it may be required to push a request switch 16 provided in the vicinity of a door handle 1b of the door 1a. When the request switch 16 is pushed, the communication of the verification and the like is performed between the vehicle-side device 2 and the portable device 3, and then the vehicle-side device 2 releases the lock of the door la in case of identifying the verification.

Figure 2:
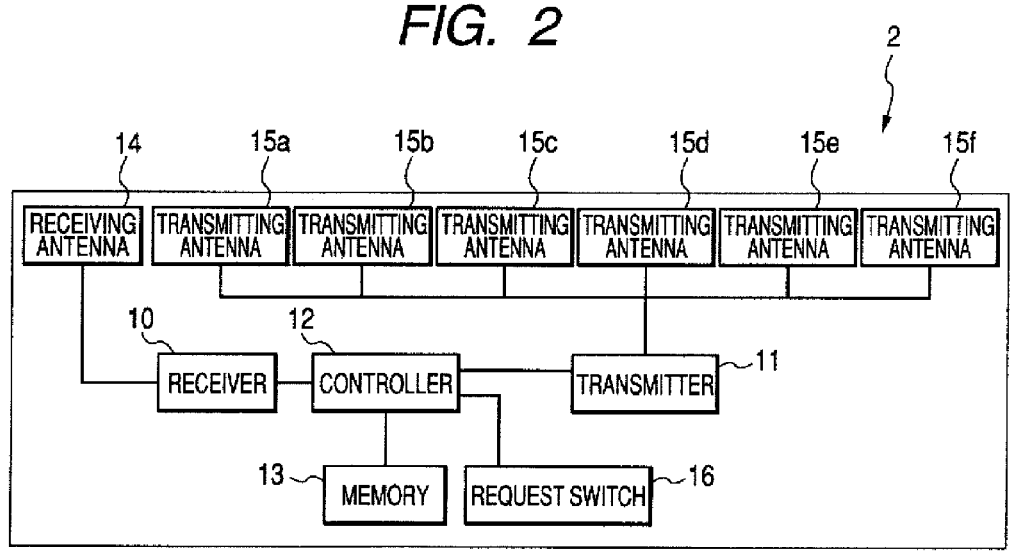
FIG. 2 is a block diagram of an embodiment of a vehicle-side device.
Figure 3:
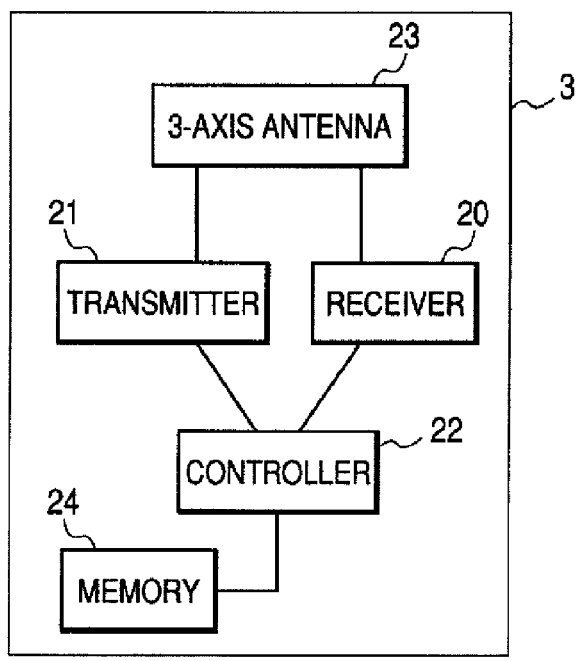
FIG. 3 is a block diagram of an embodiment of a portable device.

Next, configuration of the vehicle-side device 2 and the portable device 3 will be described. FIG. 2 illustrates a configuration of the vehicle-side device 2, and FIG. 3 illustrates a configuration of the portable device 3. As shown in FIG. 2, the vehicle-side device 2 includes a vehicle-side receiver 10 receiving the answer signal from the portable device 3, a vehicle-side transmitter 11 transmitting the request signal to the portable device 3, and a vehicle-side controller 12 performing various controls when an answer signal is received or the request switch 16 is pushed.

A memory 13 storing information for controlling V-ID (i.e. Vehicle-ID), which is the vehicle's unique identifier, and ID of the plural portable devices, which is able to manipulate one vehicle or the like, is connected to the vehicle-side controller 12. The request switch 16 is connected to the vehicle-side controller 12. A receiving antenna 14 is connected to the vehicle-side receiver 10 receiving the answer signal. A plurality of transmitting antennas 15 transmitting the request signal is connected to the vehicle-side transmitter 11. The plurality of transmitting antennas 15 is provided at several places inside and outside of the vehicle 1, respectively.

As shown in FIG. 3, the portable device 3 includes a portable device receiver 20 receiving the request signal from the vehicle-side device 2, a portable device transmitter 21 transmitting the answer signal to the vehicle-side device 2, a portable device controller 22 performing various controls at the time of receiving the request signal, and a memory 24 storing ID, V-ID, and the like, which is set by the device itself. A 3-axis antenna 23 transmitting and receiving the request signal or the answer signal is connected to the portable device receiver 20 and the portable device transmitter 21.

The portable device controller 22 is switched over from a sleep condition of which power consumption is about zero to a normal condition by a wake up signal included in the request signal that is received at the portable device receiver 20 from the vehicle-side device 2. Additionally, the portable device controller 22 performs various operations based on a command included in the request signal. The portable device controller 22 is also possible to detect a signal intensity that is received by the 3-axis antenna 23.

Figure 4:
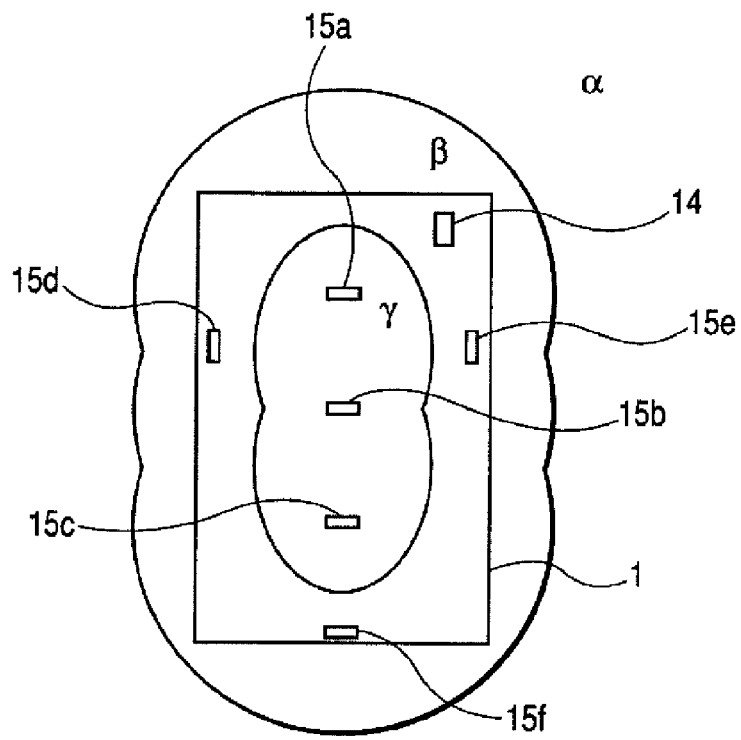
FIG. 4 is a diagram illustrating a position of an antenna provided in a vehicle.

FIG. 4 illustrates an arrangement of the receiving antenna 14 and the transmitting antenna 15 in the vehicle 1. The receiving antenna 14 is provided at one location in the vehicle 1, and the plurality of transmitting antennas 15, which includes 15a to 15f, are provided inside and outside of the vehicle 1. In the embodiment, three of the transmitting antennas 15a to 15c are provided inside of the vehicle 1, and three of the transmitting antennas 15d to 15f are provided outside of the vehicle 1, respectively.

In the embodiment, the portable device 3 judges or determines whether the portable device exists inside or outside the vehicle 1 on the basis of the boundary between the inside and outside of the vehicle. However, a method of the judgment is different when the portable device 3 is close to the boundary between the inside and outside of the vehicle and the device is apart from the boundary between the inside and outside of the vehicle at a predetermined distance or more. In the embodiment, the boundary between the inside and outside of the vehicle corresponds to an outward frame of the vehicle. In the embodiment, the boundary defines a reference surface when the inside or the outside of the vehicle is judged, and the boundary also defines a boundary surface expanded on a planar direction. The boundary is also a concept that includes a geometric surface, a virtual surface, and a predetermined object. FIG. 4 illustrates, an area γ that exists inside a surface configured to overlap two elliptic spheres inside the vehicle 1, an area α that exists outside a surface configured to overlap three spheres outside the vehicle 1, and an area β that exists between the area α and the area γ. When the portable device 3 exists in the area α or the area γ at a predetermined distance or more away from the boundary between the inside and outside of the vehicle, a position judgment is performed by a simple method, but the accuracy is not so high. Conversely, when the portable device 3 exists in the area β that is an adjacent area of the boundary between the inside and outside of vehicle, a position judgment is performed by a method having high accuracy.

A configuration of the areas is performed as below. First, the signal intensity from the transmitting antennas 15 of the vehicle 1 is measured several times by the portable device 3 in the vicinity of a position that locates along the boundary between the inside and outside of the vehicle. Then, distances from the antennas are calculated on the basis of the signal intensity. Moreover, it is previously measured about a correlation between the signal intensity and the distances from the antennas. Herein, the distances from the transmitting antennas 15a to 15c are calculated by detecting the signal intensity from the transmitting antennas 15a to 15c that are provided in the vehicle 1, respectively.

Second, specifying the positions of which distances from the transmitting antennas 15a, 15b, and 15c are estimated at the minimum, the distances are referred to as MINLa, MINLb, and MINLc, respectively. Then, the surface formed at a distance of (MINLa+MINLb) r which is the sum of distances from the transmitting antenna 15a and the transmitting antenna 15b (i.e., an elliptic spherical surface that has two focuses of the transmitting antenna 15a and the transmitting antenna 15b) is specified. Additionally, the surface formed at a distance of (MINLb+MINLc), which is the sum of distances from the transmitting antenna 15b and the transmitting antenna 15c (i.e., an elliptic spherical surface that has two focuses of the transmitting antenna 15b and the transmitting antenna 15c) is specified. Then, a surface inside formed of these two elliptic spherical shapes is defined as the area γ. An area formed of the two elliptic spherical shapes is configured with respect to the vehicle inside, but it may be allowed to configure an area formed of three spherical shapes that has an equal distance from each transmitting antenna 15.

In addition, regarding all positions where the signal intensity from the transmitting antennas 15 of the vehicle 1 is measured by the portable device 3, it is specified which one of distances from the transmitting antennas 15 is a minimum. Due to this, the distance from the transmitting antenna 15a is a minimum in a front area of the vehicle 1, the distance from the transmitting antenna 15c is a minimum in a rear area of the vehicle 1, and the distance from the transmitting antenna 15b is a minimum in a middle area between the front and rear of the vehicle 1. Next, a position where the distance from the transmitting antenna 15 having minimum distance from the areas becomes maximum is specified, and a surface where the distance from the transmitting antenna 15 becomes maximum (i.e., a spherical surface centered around the transmitting antenna 15) is specified. Three spherical surfaces are specified by performing the method mentioned above on the three areas. Finally, the outside of the three spherical surfaces is defined as the area α, and the area between the inside of the three spherical surfaces and the outside of the two elliptic spherical surfaces is defined as the area β.

The memory 13 of the vehicle-side device 2 stores ID that may be required to verify the portable device 3, data for judging a position of the portable device 3 in the vicinity of the boundary between the inside and outside of the vehicle, and data for judging area α, β, and γ. The data for judging the position in the area β of the portable device 3 is calculated from an inside data group and an outside data group that has a lot of data comparing radio wave intensities from the transmitting antennas 15 with authentication codes of the transmitting antennas 15 relative to an inside and an outside of the vehicle 1, respectively.

Each data of the inside data group has information about authentication codes and radio wave intensities corresponding to each transmitting antenna 15 relative to three of them in the order of high intensity among the intensities of the radio waves from the transmitting antennas 15 in the vicinity of the boundary between the inside and outside in the vehicle 1. Such a data is previously taken in the range of approximately whole surroundings of the inside of the vehicle 1. Each data of the out side data group is previously taken in the range of approximately whole surroundings of the outside of the vehicle 1 in the same manner as the inside data group. These acquisitions of the data are performed for the actual vehicle 1 by using the portable device 3 or an intensity measure device in the process of developing a product. Alternatively, the acquisitions of the data may be performed in the fabrication line. A parameter for calculating a Maharanobis distance from each data group is calculated, and then the parameter is stored in the memory 13 when the inside data group and the outside data group are acquired.

In case that the portable device 3 exists in the area the portable device 3 transmits data. Herein, the data has the authentication code for identifying which transmitting antennas 15 are three of the transmitting antennas 15 in order of high intensity and the radio wave intensity corresponding thereto. Relative to the data transmitted from the portable device 3, the Maharanobis distances of the inside data group and the outside data group are calculated by using the parameter that is stored in the memory 13, respectively. Then, judging which group has a small Maharanobis distance, that is, which group approximates the portable device 3, the device is judged or determined to be located in the vicinity thereof.

Figure 5:
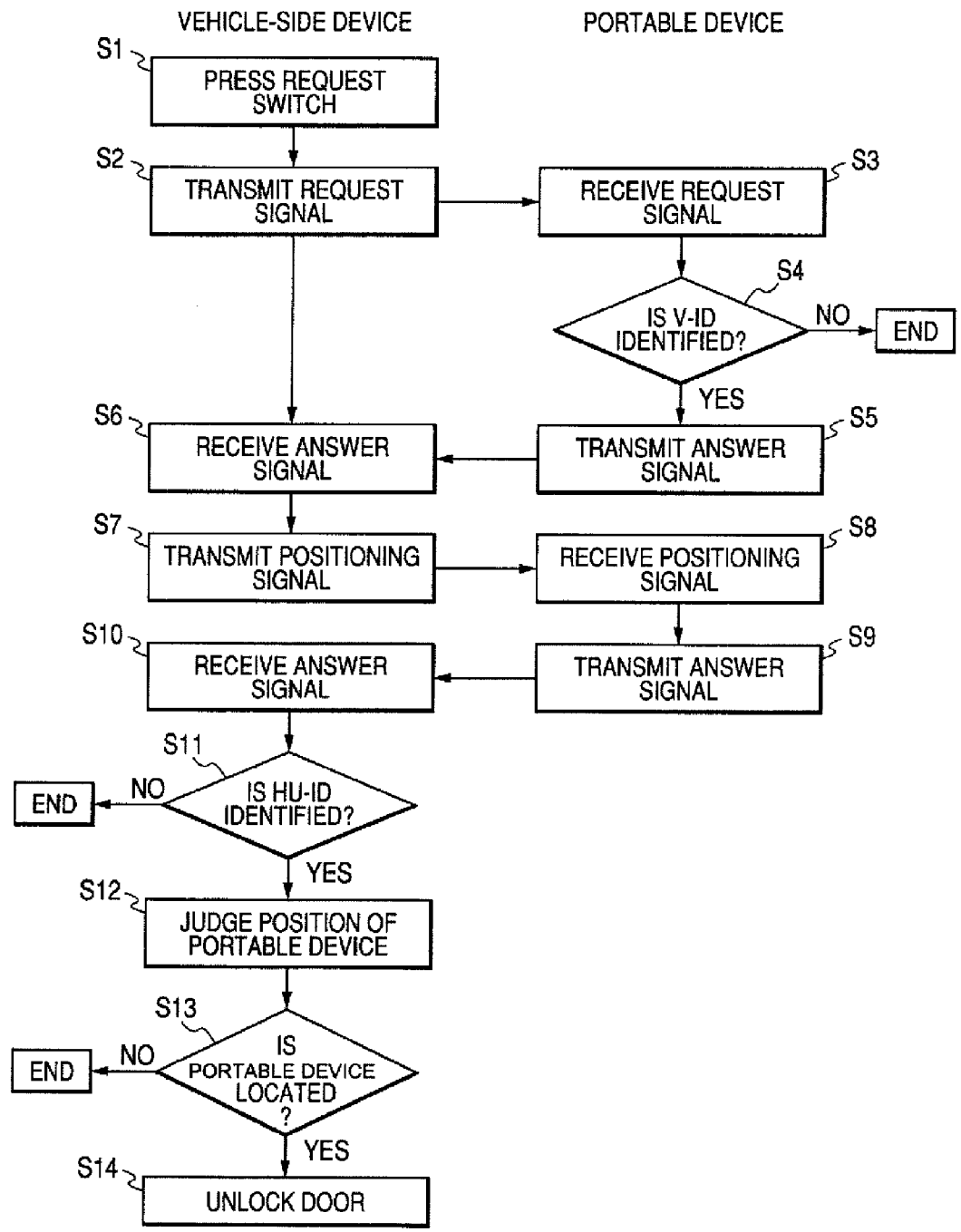
FIG. 5 is a flow chart illustrating one embodiment of an unlocking operation.
Figure 6:
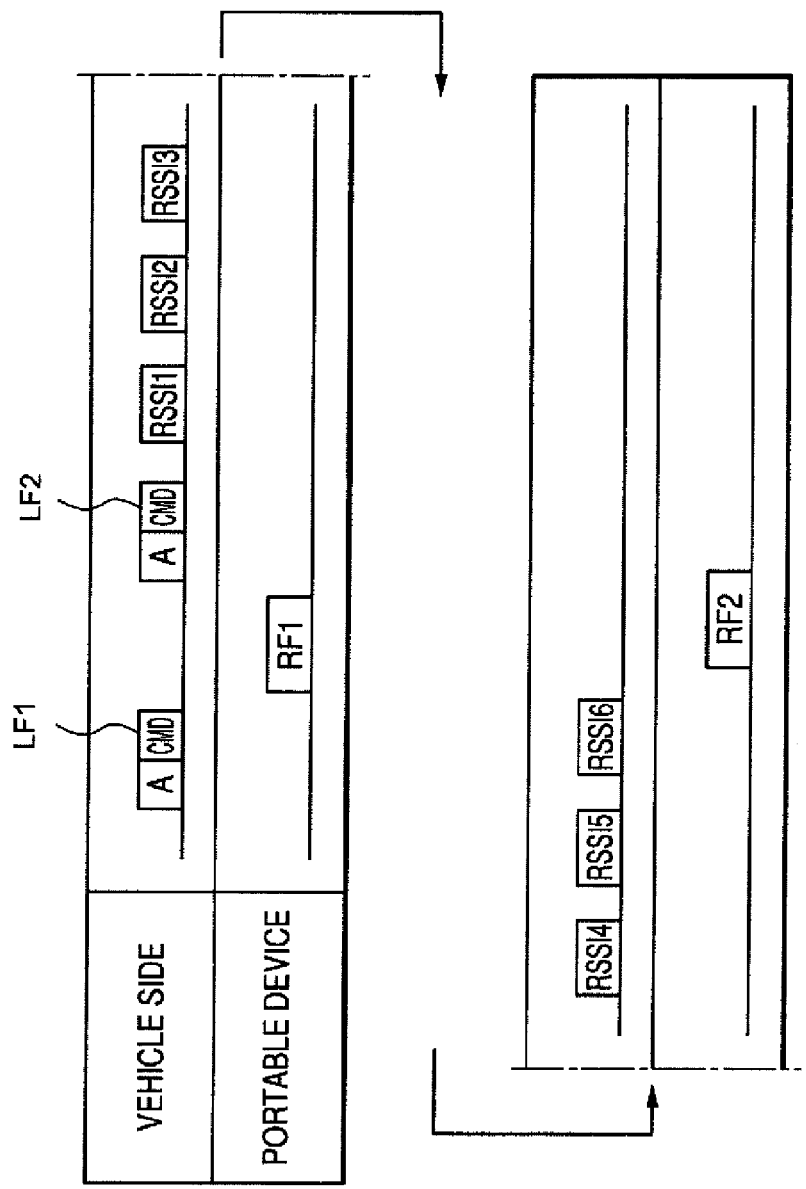
FIG. 6 is a chart diagram of signal outputted from the vehicle-side device and the portable device.

An operation of the keyless entry device will be described. FIG. 5 illustrates a flow chart concerning an operation as a door is unlocked. Additionally, FIG. 6 illustrates a chart of signals that are transmitted from the vehicle-side device 2 and the portable device 3, respectively, in the flow of FIG. 5. In the keyless entry device of the embodiment, the request switch 16 provided to the vehicle 1 is pressed, and then there is a wireless communication between the vehicle-side device 2 and the portable device 3, so the door is unlocked. Accordingly, the flow is disclosed by pressing the request switch 16 of the vehicle 1 by a user having priority (S1).

When the request switch 16 is pressed, the vehicle-side controller 12 makes the request signal LF1 transmit from the vehicle-side transmitter 11 (S2). As shown in FIG. 6, the request signal LF1 comprises a signal A including a wake up signal and a command signal CMD. The command signal CMD includes information of a V-ID (Vehicle-ID) that is a unique identifier of the vehicle.

In the portable device 3, when the request signal LEF1 is received in the portable device receiver 20, the portable device controller 22 is switched over from a sleep condition to a normal condition by a wake up signal. Then, the portable device judges whether the V-ID included in the request signal LF1 coincides with a self-sustained V-ID (S4). If the V-ID is not the same in this step, the flow is finished. If the V-ID is the same, the portable device controller 22 transmits the answer signal RF1 from the portable device transmitter 21 (S5).

If the vehicle-side receiver 10 receives the answer signal RF1 (S6), the vehicle-side controller 12 transmits the positioning signal LF2 from the vehicle-side transmitter 11 (S7). As shown in FIG. 6, the positioning signal LF2 includes the wake up signal, the signal A including the portable device ID, and a signal including the command signal CMD, like the request signal LF1. Also included is, a signal for measuring a plurality of RSSI transmitted in order of the transmitting antennas 15a to 15f. The signal A is transmitted from every transmitting antenna 15a to 15f.

The signal for measuring RSSI transmitted from the transmitting antennas 15a to 15f has a pulse shape which is kept for a predetermined time with a predetermined intensity as shown in FIG. 6. The signal is used for measuring reception intensity in the portable device 3. The vehicle-side transmitter 11 transmits the signals for measuring RSSI to the transmitting antennas 15a to 15f in a predetermined order and interval, respectively. Therefore, the portable device 3 can identify which transmitting antenna 15 transmits the signal for measuring RSSI by reception time.

The positioning signal LF2 that includes the signal for measuring RSSI transmitted from the transmitting antennas 15a to 15f is received by the portable device receiver 20 of the portable device 3 (S8). The portable device controller 22 measures intensities of the signals for measuring RSSI as mentioned above. An authentication code identifying which transmitting antenna 15 corresponds to three data including signals selected in order of high intensity in the measured signals and intensity data corresponding thereto are transmitted as the answer signal RF2 to the vehicle-side device 2 (S9). On this occasion, the answer signal RF2 is transmitted in a state in which the signal also includes the HU-ID, which is uniquely set in each portable device. The signal intensity measurement is not limited to transmit the signal for measuring RSSI from the vehicle 1 side and measure the intensity in the portable device 3 side. It may be allowed to measure the self intensity of the request signal that is transmitted from the vehicle 1 side.

The vehicle-side transmitter 11 of the vehicle-side device 2 receives the answer signal RF2 from the portable device 3 (S10). Receiving the answer signal RF2, the vehicle-side controller 12 judges or determines that the HU-ID included therein coincides with ID that is registered to the vehicle (S11). In this step, if the HU-ID is not the same with registered one, the flow is finished. If the HU-ID is the same with registered one, then a position of the portable device 3 is judged or determined (S12).

At the time of a transmission and reception of the request signal LF1, the request signal LF1 is transmitted, and then every portable device 3 transmits the answer signals RF1 through different elapses of time, respectively. Then, measuring the elapsed time, the portable devices 3 are rapidly and simply specified by which of plural portable devices 3 respond. At the time of a transmission and reception of the request signal LF2, the portable device 3 detected by using the request signal LF1 is subjected to check an accurate verification and position using the unique ID of the portable device that has large information relative to the origin thereof. If it is not possible to perform the verification, the same operation is performed on every portable device 3. It may be also possible to omit the specification of the portable device 3 by using the request signal LF1 and perform a verification of only the portable device 3 or perform a verification of every portable device 3 after transmitting the RSSI measuring signal.

Figure 7:
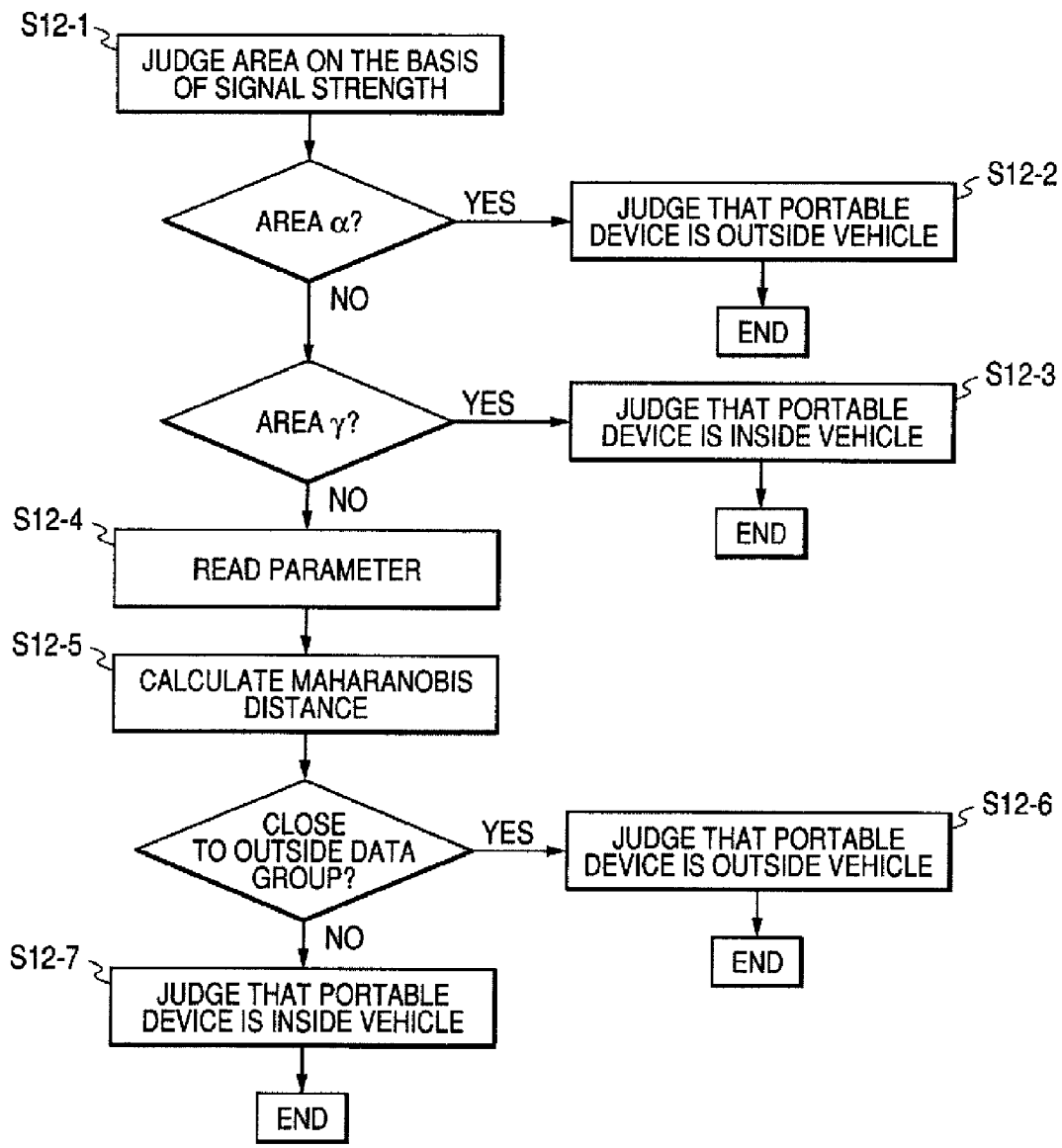
FIG. 7 is a flow chart of a position judgment of the portable device.

A position judgment of the portable device 3 is configured along a flow as below. A flow chart about the position judgment of the portable device 3 is illustrated in FIG. 7. The vehicle-side controller 12 detects a position concerning the vehicle 1 of portable device 3 and judges which of the areas α, β, and γ illustrated in FIG. 4 corresponds to the position from the authentication signal and the intensity data that is included in the answer signal RF2 transmitted from the portable device 3 (S12-1). In this step, the position of the portable device 3 is detected from a correlation of the intensity data that is previously taken and the distances from the transmitting antennas 15. Accordingly, an accuracy of the detected position is not very high, but it is possible to sufficiently perform an approximate judgment to whether the portable device 3 exists in which area.

In the case in which an area where the portable device 3 exists is judged to be the area α, the vehicle-side controller 12 judges or determines that the portable device 3 exists outside of the vehicle (S12-2) and the flow of the position judgment is finished. On the other hand, if an area where the portable device 3 exists is judged to be the area γ, the vehicle-side controller 12 judges or determines that the portable device 3 exists inside of the vehicle (S12-3) and the flow of the position judgment is finished. The area α and area γ is a certain distance apart from the boundary between the inside and outside of the vehicle as shown in FIG. 4. Therefore, if the position of the portable device 3 is judged to be the area α or γ in the step S12-1, an accuracy of the position of the portable device 3 is not very high, but it is possible to sufficiently perform a judgment to whether the portable device 3 exists inside or outside the vehicle.

Meanwhile, in the case in which the area where the portable device 3 exists is judged to be the area β, the vehicle-side controller 12 reads a parameter that may be required to calculate the Maharanobis distance from the memory 13 (S12-4). Then, the controller calculates the Maharanobis distance of the intensity data obtained from the portable device 3 and the inside data group and the Maharanobis distance of the intensity data obtained from the portable device 3 and the outside data group, respectively (S12-5). Regarding the judgment of an area, it may be possible to judge or determine whether the distance is less than a predetermined value or not less than the value. Alternatively, it may be possible to judge or determine whether the distance is not more than a predetermined value or more than the value.

When the Maharanobis distance from the intensity data that is obtained from the portable device 3 is close to the outside data group relative to the inside data group, the vehicle-side controller 12 judges or determines that the portable device 3 is outside the vehicle (S12-6) and the flow of the position judgment is finished. Conversely, when the inside data group is closer than the outside data group, the vehicle-side controller 12 judges or determines that the portable device 3 is inside the vehicle (S12-7) and the flow of the position judgment is finished.

As mentioned above, first, the area where the portable device 3 exists is judged by a convenient method. Accordingly, when the portable device 3 exists in an area at a certain distance away from the boundary between the inside and outside of the vehicle in a direction of the vehicle inside or outside, the position judgment is instantly performed on the basis of a result of the area judgment. Additionally, when the portable device 3 is located in the vicinity of the boundary between the inside and outside of the vehicle, the position judgment is performed on the basis of the Maharanobis distance. Therefore, a detailed data for calculating the Maharanobis distance is taken from the vicinity of the boundary between the inside and outside of the vehicle, whereby the process number can be highly reduced. In addition, when the portable device 3 is located in an area at a certain distance away from the boundary between the inside and outside of the vehicle, the position judgment can be performed without calculating the Maharanobis distance. Therefore, the time for the process can be reduced.

The vehicle-side controller 12 performs different controls in accordance with whether the portable device 3 exists inside or outside the vehicle 1 (S13), referring to FIG. 5. When the position of the portable device 3 does not exists outside the vehicle 1 (i.e., the portable device 3 exists inside the vehicle 1) the flow is finished.

When a door is unlocked by pressing the request switch 16, the portable device 3 exists outside the vehicle 1. The door may be unlocked in the case in which the portable device 3 exists inside the vehicle 1 with a user. It occasionally occurs that even a person which does not have the portable device 3 can unlock the door by pressing the request switch 16. To prevent this, the door is set not to be unlocked when the portable device 3 exists in the vehicle 1.

On the other hand, in the case of judging or determining that the position of the portable device 3 is outside the vehicle 1, a signal of a unlocking command is outputted to a locking unit that is not illustrated in the drawings of the door and the door is unlocked (S14), referring to FIG. 5. The position of the portable device 3 is judged or determined by the Maharanobis distance calculation from the inside data group and the outside data group. Accordingly, it is possible to judge the position with high accuracy, and an error operation of the unlocking can decrease.

The operation that unlocks the door by pressing the request switch 16 is described. However, the operation that unlocks the door is also subjected to the position judgment or determination of the portable device 3 in the same manner as mentioned above. Therefore, the control can be performed in accordance with the result. Additionally, it is not limited to the door's locking and unlocking operation, such an operation that starts an engine is also subjected to the position judgment of the portable device 3 in the same manner as mentioned above. Therefore, the operation can be performed in accordance with the result.

A second embodiment of the invention will be described. In the first embodiment, the position of the portable device 3 is judged whether the position is inside or outside the vehicle 1, but the position judgment is not limited to this. The second embodiment relates to performing a judgment about whether a portable device 3 exists inside or outside a boundary at a predetermined distance away from a vehicle 1 towards the outside. The judgment is performed at the boundary that is formed at a distance of about 1.5 m from a transmitting antenna 15 provided to a door handle 1*b* of the vehicle 1.

A configuration of a keyless entry device according to the embodiment is almost the same as the first embodiment, and the configuration is also the same as illustrated in FIGS. 1 to 4. The description about the configuration, which is the same as the first embodiment, is omitted. This embodiment is different in aspects of an area configuration in an area judgment based on a signal intensity from the portable device 3 and data stored in the memory 13 for the position judgment of the portable device 3 by calculating the Maharanobis distance.

Figure 8:
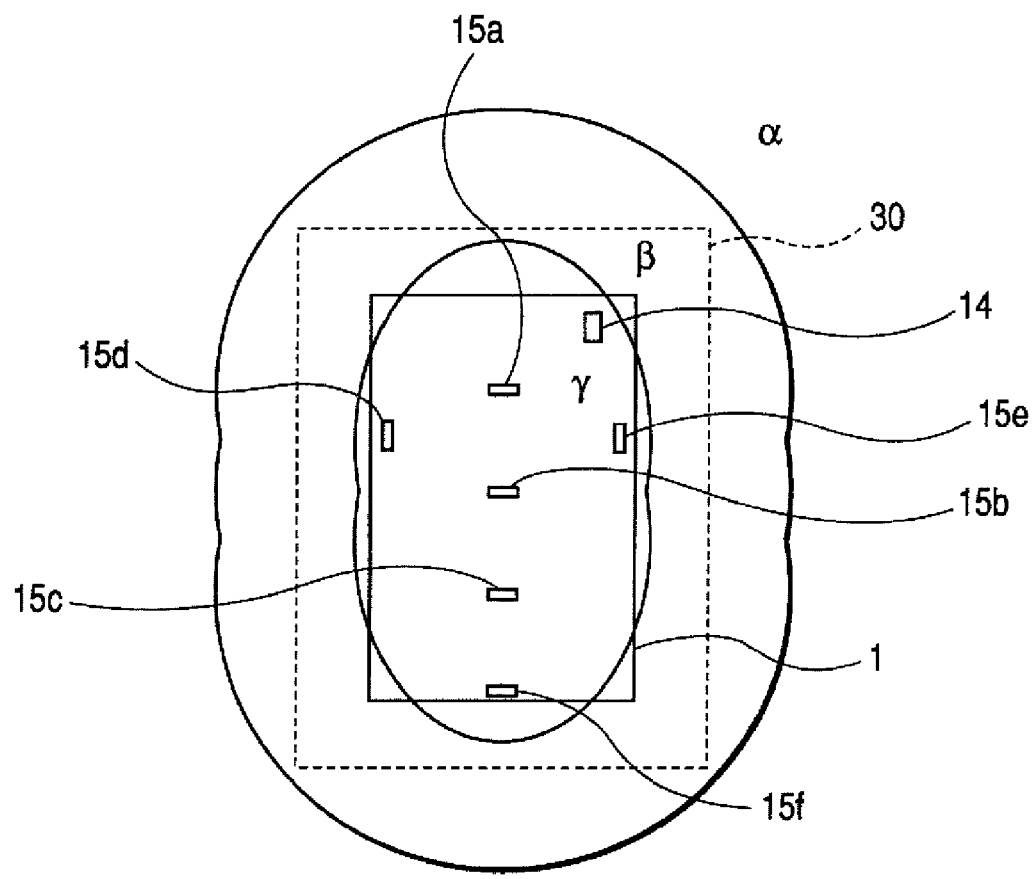
FIG. 8 is a diagram illustrating an area partition around a vehicle according to a second embodiment.

FIG. 8 illustrates an arrangement of a receiving antenna 14 and a transmitting antenna 15 in the vehicle 1. The arrangement of the receiving antenna 14 and the transmitting antenna 15 is the same as the first embodiment. The difference is a range of an area used in a position judgment of the portable device 3. In the embodiment, the area is configured on the basis of a boundary 30 that is formed at the distance of about 1.5 m from the boundary between the inside and outside of the vehicle.

As shown in FIG. 8, an area γ inside a surface formed by overlapping two elliptical spheres exists in the boundary 30, and an area α outside a surface formed by overlapping three spheres exists in the boundary 30. Additionally, an area β outside a surface formed by overlapping two elliptical spheres and inside a surface formed by overlapping three spheres exists in the vicinity of the boundary 30. Such areas can be configured to be the same by applying the same manner as the first embodiment to the boundary 30 that is formed at the distance of 1.5 m from the vehicle 1.

In the same way as the first embodiment, when the portable device 3 exists in the area α or area γ that is separated at a certain distance from the boundary 30, the position judgment is instantly performed on the basis of the judgment result of the area where the portable device 3 is located. Alternatively, when the portable device 3 exists in area β in the vicinity of the boundary 30, the position judgment is performed on the basis of the Maharanobis distance calculation as described below.

The memory 13 stores a parameter that is calculated by a first data group and a data group that is calculated by a second data group. Each data of the first data group acquires data along a surface separated as far as about 5 cm from the boundary 30 toward the vehicle 1. The data taken in the embodiment is the same as the first embodiment. The data includes an authentication code identifying which transmitting antenna 15 corresponds to three radio waves selected in order of high intensity in radio wave intensities from the transmitting antennas 15. Also included is radio wave intensities corresponding thereto. Each data of the second data group acquires data along a surface separated as far as about 5 cm from the boundary 30 on the side opposite to the vehicle 1.

By calculating a parameter from each data group for obtaining the Maharanobis distance, the parameter is stored in the memory 13. The vehicle-side controller 12 uses the parameter stored in the memory 13, and the controller calculates the Maharanobis distances of the data obtained from the portable device 3, the first data group, and the second data group. The controller also judges whether the portable device 3 exists inside or outside the boundary 30 (i.e., whether the device is separated as far as about 1.5 m or more or not from the vehicle 1). The vehicle-side controller 12 also performs a control in accordance with the judgment result. For example, in the case of judging that the portable device 3 is closer than about 1.5 m to the vehicle, a light, which shines on a riding position and provided in the vicinity of the door of the vehicle 1, is turned on. Due to this operation, a user can be easy to ride on the vehicle 1, and recognizing the existence of the portable device 3 in vehicle 1 side is informed to the user.

The embodiments of the invention are described as mentioned above, but the invention is not limited to the embodiment, and may be modified in various forms without departing from the technical spirit of the invention. For example, in the embodiment described above, the three transmitting antennas 15 are provided to each inside and outside of the vehicle 1 as shown in FIG. 4. However, the number and arrangement of the transmitting antennas 15 is not limited to this. More or less antennas may be provided inside and outside the vehicle 1. Preferably, when the plurality of transmitting antenna 15 is provided, the position is judged with high accuracy. Moreover, selecting intensities in order of high intensity in reception intensities received from the transmitting antennas 15 (the intensities used as data in the position judgment) is not limited to selecting three intensities. All data may be available.

In these embodiments, the vehicle-side controller 12 of the vehicle-side device 2 calculates the Maharanobis distance of the data and each data group obtained from the portable device 3. However, it may be allowed that a memory that is the same as the memory 13 is provided to the portable device 3, whereby the parameter required calculating the Maharanobis distance is stored in the memory, and then the position judgment of the portable device 3 is performed by calculating the Maharanobis distance in the portable device controller 22.

A data stored in the memory 13 may be allowed to be each data group itself. In that case, the Maharanobis distance is calculated from the data group at the time of the position judgment of the portable device 3. A method of the position judgment is not limited to the Maharanobis distance calculation, and it may be possible to use a linear discriminant.

Preferably, the method using the Maharanobis distance is possible to perform the position judgment more accurately. It may be also possible to judge the position by using a neural network based on a plurality of data without using the Maharanobis distance calculation.

Additionally, in these embodiments, the plurality of transmitting antennas 15 is provided in the vehicle-side device 2, and the intensities of the plurality of RSSI measuring signal is measured in the portable device 3, whereby the position judgment of the portable device 3 is performed on the basis thereof. Conversely, the plurality of receiving antennas 14 is provided in the vehicle-side device 2, and signal intensity from the portable device 3 is measured by a plurality of receiving antenna 14, whereby the position judgment of the portable device 3 is performed in the vehicle-side controller 12 on the basis thereof. At this time, the signal from the portable device 3 includes the answer signal and the signal for measuring the intensity. In that case, the data stored in the memory 13 includes an inside data group (which is gathered with a lot of a reception intensity data of the plurality of receiving antenna 14 when the portable device 3 matches for the inside of the vehicle 1) and an outside data group, which is gathered with a lot of the same reception intensity data relative to the outside of the vehicle 1.

The present applicant contrives a keyless entry device configuring a data group of a vehicle inside and a data group of a vehicle outside by previously obtaining information of an intensity from a plurality of transmitting antennas in each case of a portable device in accordance with the vehicle inside and the vehicle outside distinguished by a boundary between the inside and outside of a vehicle. Detecting signal intensities from the plurality of transmitting antennas is accomplished for judging a position of the portable device. Judging or determining which side of data groups of the vehicle inside or the vehicle outside approximates to the data is done by using a Maharanobis distance calculation. Further, the boundary, which is a reference judging a position, is not limited to the boundary between the inside and outside of the vehicle.

In consideration of the aforementioned problems, it is an object to provide a keyless entry device capable of judging whether the portable device is located on any side of the inside and outside boundary of the vehicle. The inside and outside of the other predetermined boundary may not be limited to the vicinity of the boundary and can be judged with high accuracy.

Specifically, to solve the problems mentioned above, the invention relates to a keyless entry device for locking and unlocking doors of a vehicle by performing a wireless communication between a vehicle-side device and a portable device, and more particularly, to the keyless entry device for accurately judging where the portable device exists inside or outside a predetermined boundary.

In the keyless entry device according to an exemplary embodiment, a distance from the predetermined boundary of the portable device is judged on the basis of the intensity information obtained by allowing the portable device to receive a signal transmitted from the plurality of transmitting antennas. A position of the portable device is judged from the judgment result when it is judged that the distance of the portable device from the predetermined boundary is equal to or greater than a predetermined distance. The position is judged from which one data group of the first and second data groups the intensity information approximates by using the first and second data groups or the first and second parameters when it is judged that the distance of the portable device from the predetermined boundary is equal to or less than a predetermined distance. Therefore, it is possible to judge the position of the portable device with high accuracy. The position judgment is performed with high accuracy by the intensity information of the signal received by the portable device even in the area apart from the boundary. Additionally, because there is no need to previously acquire detailed data from the area apart from the boundary, it may be enough to acquire only data in vicinity of the boundary. Therefore, the number of processes can be highly reduced, and accuracy also becomes high. Further, in the area apart from the boundary, the position of the portable device is instantly judged on the basis of the intensity information of the signal received by the portable device, thereby being capable of reducing the process time.

Additionally, in the keyless entry device according to an embodiment, Maharanobis distances of the intensity information of the signals and the data groups are calculated by using the data groups or the parameters. The device judges that the intensity information approximates the data group having a small Maharanobis distance therebetween. Therefore, it is possible to perform a position judgment more accurately.

In addition, in the keyless entry device according to an embodiment, the position of portable device is judged by a neural network when it is judged that the distance of the portable device from the predetermined boundary is equal to or less than a predetermined distance. Therefore, it is possible to perform a position judgment more accurately.

Further, in the keyless entry device according to an embodiment, a predetermined boundary with respect to the vehicle is a boundary between the inside and outside of the vehicle. Accordingly, it is possible to judge whether the portable device is located inside or outside the vehicle.

In the keyless entry device according to an embodiment, a predetermined boundary with respect to the vehicle is a surface that is spaced by a predetermined distance away from the transmitting antennas provided in the vicinity of a door of vehicle toward the outside of the vehicle. Therefore, it is possible to judge whether the portable device is close to the vehicle as far as a predetermined distance.

It is intended that the foregoing detailed description be regarded as illustrative rather than limiting, and that it be understood that the following claims, including all equivalents, are intended to define the scope of this invention.

What is claimed is:

1. A keyless entry system comprising:
a vehicle-side device including a vehicle-side transmitter that has a plurality of transmitting antennas operable to transmit a request signal provided in a vehicle and a vehicle-side receiver operable to receive an answer signal; and
a portable device including a portable device receiver operable to receive the request signal and a portable device transmitter operable to transmit the answer signal,
wherein the vehicle-side device includes a vehicle-side controller operable to perform a predetermined control process when the answer signal from the portable device is authenticated,
wherein the portable device includes a portable device controller operable to detect respective intensity of signals transmitted from the plurality of transmitting antennas of the vehicle-side device,
wherein at least one of the vehicle-side controller and the portable device controller includes a memory operable to store data, the memory operable to store at least one of an inside data group having a plurality of intensity information obtained by allowing the portable device to receive a signal transmitted from the plurality of transmitting antennas and a first parameter required to compare the inside data group with the intensity information when the portable device is located along one side of a predetermined boundary with respect to the vehicle, and the memory operable to store at least one of an outside data group having a plurality of intensity information obtained by allowing the portable device to receive a signal transmitted from the plurality of transmitting antennas and a second parameter required to compare the outside data group with the intensity information when the portable device is located along the other side of predetermined boundary with respect to the vehicle,
wherein at least one of the vehicle-side controller and the portable device controller, including the memory, is operable to judge a distance of the portable device from a predetermined boundary on the basis of the intensity information obtained by allowing the portable device to receive a signal transmitted from the plurality of transmitting antennas,
wherein at least one of the vehicle-side controller and the portable device controller is further operable to judge a position of the portable device in accordance with the judgment result when it is judged that the distance of the portable device from the predetermined boundary is equal to or greater than a predetermined distance, the position is judged from which one data group of the inside data group and the outside data group the intensity information approximates, the determination being based on at least one of the inside data group, outside data group, the first parameter, and the second parameter when it is determined that the distance of the portable device from the predetermined boundary is equal to or less than a predetermined distance,
wherein at least one of the vehicle-side controller and the portable device controller is operable to calculate a Mahalanobis distance of the intensity information of and the inside and outside data groups by using at least one of the inside data group, the outside data group, the first parameter and the second parameter, and
wherein at least one of the vehicle-side controller and the portable device controller is further operable to judge that the intensity information approximates at least one of the inside data group and the outside data group having a small Mahalanobis distance therebetween,
wherein the vehicle-side controller judges that the portable device is outside the vehicle when the Mahalanobis distance from the intensity data that is obtained from the portable device is closer to the outside data group than the inside data group, and
wherein the vehicle-side controller judges that the portable device is inside the vehicle when the Mahalanobis distance is closer to the inside data group than the outside data group.

2. The keyless entry system according to claim 1, wherein the predetermined boundary with respect to the vehicle is a boundary between the inside and outside of the vehicle.

3. The keyless entry system according to claim 1, wherein the predetermined boundary with respect to the vehicle is a surface that is spaced by a predetermined distance away from the transmitting antennas provided in the vicinity of a door of vehicle toward the outside of the vehicle.

* * * * *

UNITED STATES PATENT AND TRADEMARK OFFICE
CERTIFICATE OF CORRECTION

| | |
|---|---|
| PATENT NO. | : 8,130,076 B2 |
| APPLICATION NO. | : 11/746474 |
| DATED | : March 6, 2012 |
| INVENTOR(S) | : Satoshi Nakajima et al. |

It is certified that error appears in the above-identified patent and that said Letters Patent is hereby corrected as shown below:

In the Claims

In column 14, claim 1, line 38, after "intensity information" delete "of".

Signed and Sealed this
Twelfth Day of June, 2012

David J. Kappos
*Director of the United States Patent and Trademark Office*